United States Patent
Hosseini et al.

(10) Patent No.: US 11,937,182 B2
(45) Date of Patent: Mar. 19, 2024

(54) SIDELINK RESOURCE ALLOCATION WITH POWER SAVING OPERATION

(71) Applicant: QUALCOMM Incorporated, San Diego, CA (US)

(72) Inventors: Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 17/449,648

(22) Filed: Sep. 30, 2021

(65) Prior Publication Data

US 2022/0110055 A1    Apr. 7, 2022

Related U.S. Application Data

(60) Provisional application No. 63/087,129, filed on Oct. 2, 2020.

(51) Int. Cl.
*H04W 52/02* (2009.01)
*H04W 76/28* (2018.01)

(52) U.S. Cl.
CPC ....... *H04W 52/0229* (2013.01); *H04W 76/28* (2018.02)

(58) Field of Classification Search
CPC ............. H04W 52/0229; H04W 76/28; H04W 76/14; H04W 52/0258; H04W 52/0216; Y02D 30/70
See application file for complete search history.

(56) References Cited

U.S. PATENT DOCUMENTS

| | | | |
|---|---|---|---|
| 2021/0227604 A1* | 7/2021 | Huang | H04W 40/248 |
| 2021/0352710 A1 | 11/2021 | Lu et al. | |
| 2022/0030575 A1 | 1/2022 | Farag | |
| 2022/0110060 A1 | 4/2022 | Yang et al. | |
| 2022/0377709 A1* | 11/2022 | Zhao | H04W 72/02 |
| 2022/0399917 A1 | 12/2022 | Shin et al. | |
| 2022/0400527 A1* | 12/2022 | Yoon | H04W 72/25 |

(Continued)

FOREIGN PATENT DOCUMENTS

| | | |
|---|---|---|
| WO | 2017052451 A1 | 3/2017 |
| WO | 2018064477 A1 | 4/2018 |

OTHER PUBLICATIONS

3GPP TSG-RAN WG1 Meeting #102-e; R1-2006444; Source: Ericsson, Title: Resource allocation mechanisms for power saving, e-Meeting, Aug. 17-28, 2020 (Year: 2020).*

(Continued)

*Primary Examiner* — Mohammed S Chowdhury
(74) *Attorney, Agent, or Firm* — Procopio, Cory, Hargreaves & Savitch LLP/QUALCOMM Incorporated

(57) ABSTRACT

To facilitate efficient mode 2 sidelink resource allocation, methods, apparatuses, and computer program products are provided. An example method of a first wireless device includes applying a power saving mode for sidelink communication, the power saving mode having an ON duration and an OFF duration. The method further includes performing at least one of sensing or resource selection for sidelink mode 2 resource allocation based on one or more parameters, the one or more parameters being based on the ON duration and the OFF duration of the power saving mode.

29 Claims, 12 Drawing Sheets

(56) References Cited

U.S. PATENT DOCUMENTS

2023/0024646 A1* 1/2023 Park ................ H04W 72/20
2023/0066041 A1* 3/2023 Guo ................ H04W 52/0216

OTHER PUBLICATIONS

3GPP TSG RAN WG1 #102-e; R1-2005403; Source: vivo; Title: Resource allocation for sidelink power saving; e-Meeting, Aug. 17-28, 2020. (Year: 2020).*

3GPP TSG RAN WG1 #102-e; R1-2006009; Source: OPPO, Title: Power saving mechanisms for NR SL, e-Meeting, Aug. 17-28, 2020. (Year: 2020).*

3GPP TSG RAN WG1 #102-e; R1-2005545; Source: Fujitsu; Title: Considerations on partial sensing in NR V2X, e-Meeting, Aug. 17-28, 2020. (Year: 2020).*

International Search Report and Written Opinion—PCT/US2021/053201—ISA/EPO—Jan. 7, 2022.

Lenovo., et al., "Sidelink Resource Allocation for Power saving", 3GPP TSG RAN WG1 #102-e, 3GPP Draft, R1-2005839, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 7, 2020 (Aug. 7, 2020), XP051915064, 7 Pages, Retrieved from the Internet: URL: https://ftp.3gpp.org/tsg_ran/WG1_RL1/TSGR1_102-e/Docs/R1-2005839.zip R1-2005839.docx [retrieved on Aug. 7, 2020] pp. 2-7.

Vivo: "Discussion on Sidelink DRX", 3GPP TSG RAN WG1 #102-e, 3GPP Draft, R1-2005405, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917430, 3 Pages, Retrieved from the Internet: URL: https://ftp.3gpp.org/tsg_ran/WG1_RL1/TSGR1_102-e/Docs/R1-2005405.zip R1-2005405 Discussion on sidelink DRX.docx [retrieved on Aug. 8, 2020] pp. 1-2.

3GPP TS 38.214, "3rd Generation Partnership Project, Technical Specification Group Radio Access Network, NR, Physical Layer Procedures for Data (Release 16)", V16.3.0, Sep. 2020, 165 Pages, Section 8.1.4.

Intel Corporation: "Sidelink Enhancements for UE Power Saving", 3GPP TSG RAN WG1 Meeting #102-E, R1-2005896, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051917798, 9 Pages.

* cited by examiner

SIDELINK RESOURCE ALLOCATION WITH POWER SAVING OPERATION

CROSS REFERENCE TO RELATED APPLICATION(S)

This application claims the benefit of and priority to U.S. Provisional Application Ser. No. 63/087,129, entitled "SIDELINK RESOURCE ALLOCATION WITH POWER SAVING OPERATION" and filed on Oct. 2, 2020, which is expressly incorporated by reference herein in its entirety.

INTRODUCTION

The present disclosure relates generally to communication systems, and more particularly, to sidelink communication with a power saving mode for wireless devices.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may include direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus of a wireless device are provided. An example method includes applying a power saving mode for sidelink communication, the power saving mode having an ON duration and an OFF duration. The example method may further include performing at least one of sensing or resource selection for sidelink mode 2 resource allocation based on one or more parameters, the one or more parameters being based on the ON duration and the OFF duration of the power saving mode.

An example apparatus includes a memory and at least one processor coupled to the memory and configured to apply a power saving mode for sidelink communication, the power saving mode having an ON duration and an OFF duration. The at least one processor coupled to the memory may be further configured to perform at least one of sensing or resource selection for sidelink mode 2 resource allocation based on one or more parameters, the one or more parameters being based on the ON duration and the OFF duration of the power saving mode.

An example apparatus includes means for applying a power saving mode for sidelink communication, the power saving mode having an ON duration and an OFF duration. The example apparatus may further include means for performing at least one of sensing or resource selection for sidelink mode 2 resource allocation based on one or more parameters, the one or more parameters being based on the ON duration and the OFF duration of the power saving mode.

An example computer-readable storage medium storing computer executable code for wireless communication at a wireless device may be provided. The code when executed by a processor may cause the processor to apply a power saving mode for sidelink communication, the power saving mode having an ON duration and an OFF duration. The code when executed by the processor may further cause the processor to perform at least one of sensing or resource selection for sidelink mode 2 resource allocation based on one or more parameters, the one or more parameters being based on the ON duration and the OFF duration of the power saving mode.

In an aspect of the disclosure, a method, a computer-readable medium, and an apparatus of a wireless device are provided. An example method includes applying a power saving mode for sidelink communication, the power saving mode having ON and OFF durations. The example method may further include determining one or more parameter for sensing based sidelink resource selection based on the ON and OFF durations of the power saving mode.

An example apparatus includes a memory and at least one processor coupled to the memory and configured to apply a power saving mode for sidelink communication, the power saving mode having ON and OFF durations. The at least one processor coupled to the memory may be further configured to determine one or more parameter for sensing based sidelink resource selection based on the ON and OFF durations of the power saving mode.

An example apparatus includes means for applying a power saving mode for sidelink communication, the power saving mode having ON and OFF durations. The example apparatus may further include means for determining one or more parameter for sensing based sidelink resource selection based on the ON and OFF durations of the power saving mode.

An example computer-readable medium storing computer executable code for wireless communication at a wireless device may be provided. The code when executed by a processor may cause the processor to apply a power saving mode for sidelink communication, the power saving mode having ON and OFF durations. The code when executed by the processor may further cause the processor to determine one or more parameter for sensing based sidelink resource selection based on the ON and OFF durations of the power saving mode.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
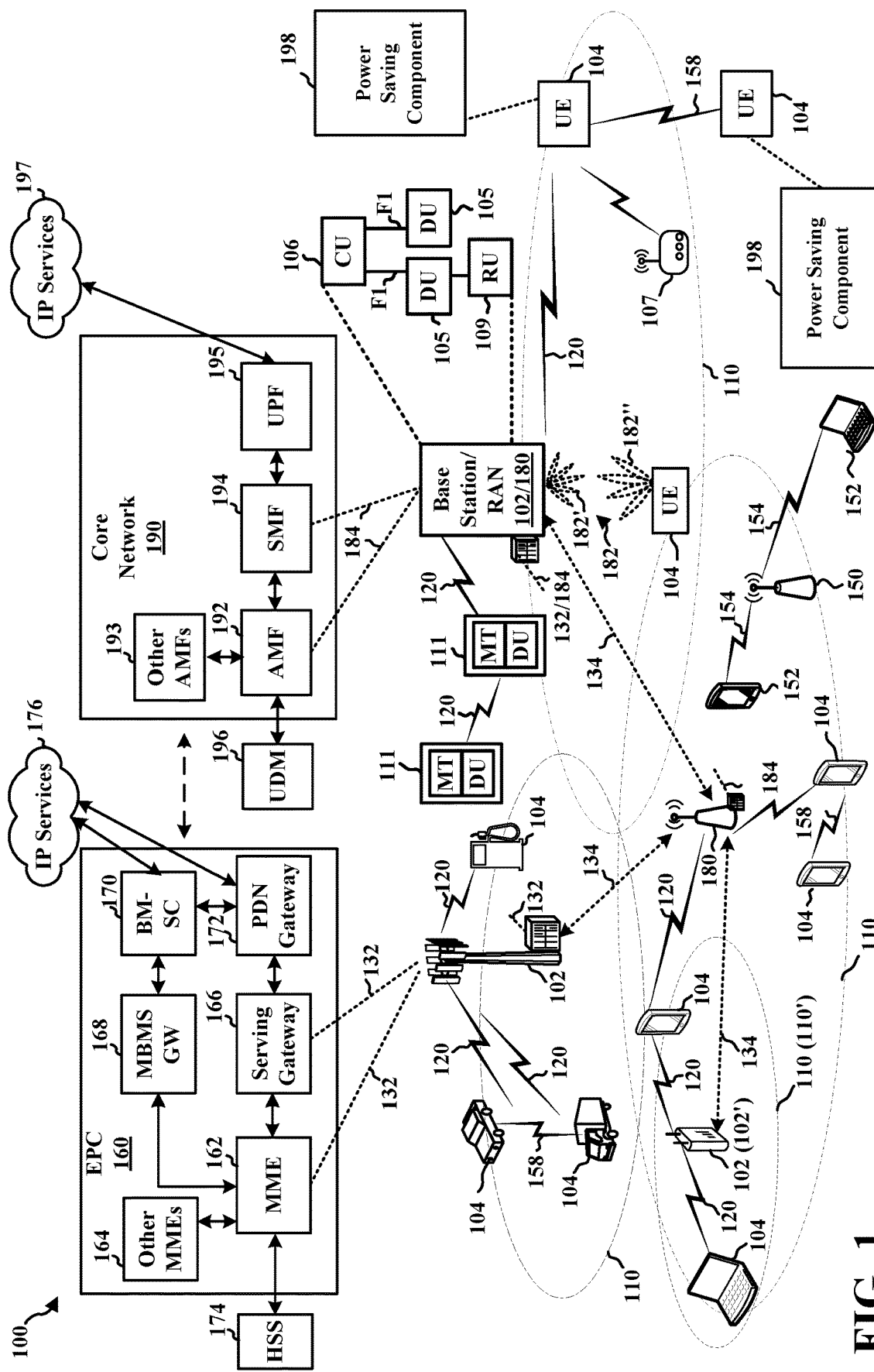
FIG. 1 is a diagram illustrating an example of a wireless communications system and an access network.

In some wireless communication systems, two resource allocation modes may be supported for sidelink communications. Under a first mode, which may be referred to as resource allocation mode 1, a base station may schedule sidelink transmission resource(s) to be used by a wireless device for sidelink transmission(s). The resource allocation mode 1 may be referred to as a centralized resource allocation mode, e.g., in which a network entity allocates sidelink resources for multiple sidelink devices. Under a second mode, which may be referred to as resource allocation mode 2, the wireless device may select its own resources for sidelink transmission, e.g., without the base station or central entity scheduling the sidelink transmission resource(s) for the wireless device. The resource allocation mode 2 may be referred to as a decentralized resource allocation mode or sensing based sidelink resource allocation mode, e.g., where each sidelink device selects its own sidelink resources for sidelink transmissions. Thus, rather than receiving an allocation of sidelink resources (e.g., as in resource allocation mode 1), in resource allocation mode 2 (e.g., sensing based sidelink resource allocation) the wireless device may determine the sidelink transmission resource(s) based on a sensing and resource reservation. Example aspects of sensing and resource reservation are described in connection with FIG. 5. By way of example, sensing may be monitoring and receiving sidelink control information (SCI) from one or more UEs in a sensing window for the purpose of resource selection (selecting resource for sidelink transmission).

A wireless device, such as a UE, may employ a power saving mode. Examples of power saving modes include a discontinuous reception (DRX) scheme and resource allocation mode 2 with a partial sensing scheme, which enable power savings by the UE skipping reception and/or sensing for periods of time. DRX and partial sensing may include an ON duration during which the UE may perform sensing/monitoring, transmission and reception over a period of time. The UE may sleep for the remainder of time, e.g., skipping reception, monitoring, or sensing during the duration outside of the ON duration. Because the DRX and the partial sensing may be separately configured for one UE (by a base station or without base station signaling), resource selections triggered for a sensing procedure may occur during a configured OFF duration for DRX. Without taking ON duration or OFF duration into account, sensing procedures may take place during a DRX OFF duration, resulting in potential extra power consumption or potential missed sensing. Similarly, for a receiving UE operating under DRX, resource selection for the transmitting UE may select resources during a DRX OFF duration of the receiving UE, resulting in transmissions using resources during the DRX OFF duration of the receiving UE not successfully received by the receiving UE. Aspects included herein provide mechanisms for coherently configuring sensing and reservation for UEs operating in DRX and resource allocation mode 2 with partial sensing so that parameters, such as sensing window timing and resource selection window timing, are determined based on ON and OFF durations, which may result in power saving and more reliable transmissions.

Aspects presented herein may be based on a DRX pattern having an ON duration and an OFF duration and may provide power saving for sidelink communications. In DRX, a UE may periodically enter a sleep state to save power or enter an awake state to monitor for and receive a PDCCH, PSCCH, or the like. The term "sensing" may refer to a procedure in which a UE monitors for resource reservations by other sidelink UEs to select resources for sidelink transmissions from unreserved resources. The term "partial sensing" may refer to a procedure in which a UE performs sensing discontinuously based on configurations (e.g., by a base station or without base station signaling). The overall time that the UE is ON, which may equal to a semi-statically configured DRX ON duration (e.g., the duration which a UE has to stay on based on the DRX configuration) plus a dynamically extended time, may be referred to as a DRX active duration. For example, a UE may be awake during a configured duration where the UE monitors for PDCCH or PSCCH, and the UE may be additionally awake in an extended period of time based on one or more timers or one or more transmissions (such as DCI or SCI) between the UE and another entity, such as a UE or a base station. As an example, if the UE receives a PSCCH indicating a new sidelink transmission or a retransmission to be received outside of the UE's DRX ON duration, the UE's awake time may be extended. The one or more timers may include an inactivity timer or a hybrid automatic repeat request (HARQ) round trip time (RTT) As used herein, the term "ON duration" may refer to a DRX ON duration (e.g., a configured duration based on a DRX configuration where a UE monitors for PDCCH, PSCCH, or the like) or a DRX active duration (e.g., a duration where a UE is awake, which may include the duration where a UE monitors for a channel such as a PDCCH or a PSCCH, a duration where a UE is receiving a PDCCH or a PSCCH, and a duration where the UE has not fell asleep due to one or more transmissions) and the term "OFF duration" may refer to a DRX OFF duration (e.g., a duration where a UE is not in the configured duration to monitor for PDCCH) or a DRX inactive duration (e.g., a duration where a UE is not in the active duration). A sidelink device may determine at least one parameter for sensing based on sidelink resource selection (e.g., mode 2 sidelink resource allocation) based on the ON duration and the OFF duration of the power saving mode and may perform sensing or resource selection based on the at least one parameter. In some examples, the wireless device may determine a time interval (e.g., $T_1$) between a trigger for sidelink resource selection and a beginning of a resource selection window based, at least in part, on the ON duration and the OFF duration of the power saving mode of the wireless device or a receiving wireless device. For example, if the device receives a trigger at slot n that would trigger a selection window at $n+T_1$ that would be outside of the ON duration of the wireless device or a receiving wireless device, the wireless device may start the resource selection window from a start of an ON duration of the wireless device or a receiving wireless device. In some examples, the wireless device may monitor for sidelink reservations within a sensing window (e.g., having a duration T0) based on the ON duration and the OFF duration of the power saving mode. If the wireless device is triggered at a slot during a current ON duration, and if the current ON duration partially overlaps the sidelink resource selection window, the wireless device may select a set of resources from one or more of the current ON duration or a next ON duration. In some examples, the wireless device may select the set of resources from the current ON duration if a gap between the slot in which the resource selection is triggered and a beginning of the next ON duration is larger than a remaining packet delay budget (PDB).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects are described in this application by illustration to some examples, those skilled in the art will understand that additional aspects and use cases may come about in many different arrangements and scenarios. Aspects described herein may be implemented across many differing platform types, devices, systems, shapes, sizes, and packaging arrangements. For example, aspects and/or uses may come about via integrated chip aspects and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Aspects may range a spectrum from chip-level or modular components to non-modular, non-chip-level aspects and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

A UE 104, Road Side Unit (RSU) 107, or other sidelink device may include a power saving component 198 configured to apply a power saving mode for sidelink communication, the power saving mode having an ON duration and an OFF duration. The power saving component 198 may be further configured to perform at least one of sensing or resource selection for sidelink mode 2 resource allocation based on one or more parameters, the one or more parameters being based on the ON duration and the OFF duration of the power saving mode.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations 180, such as a gNB may operate in a traditional sub 6 GHz spectrum, in millimeter wave frequencies, and/or near millimeter wave frequencies in communication with the UE 104. When the gNB (e.g., base station 180) operates in millimeter wave or near millimeter wave frequencies, the gNB may be referred to as a millimeter wave base station. The millimeter wave base station (e.g., base station 180) may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
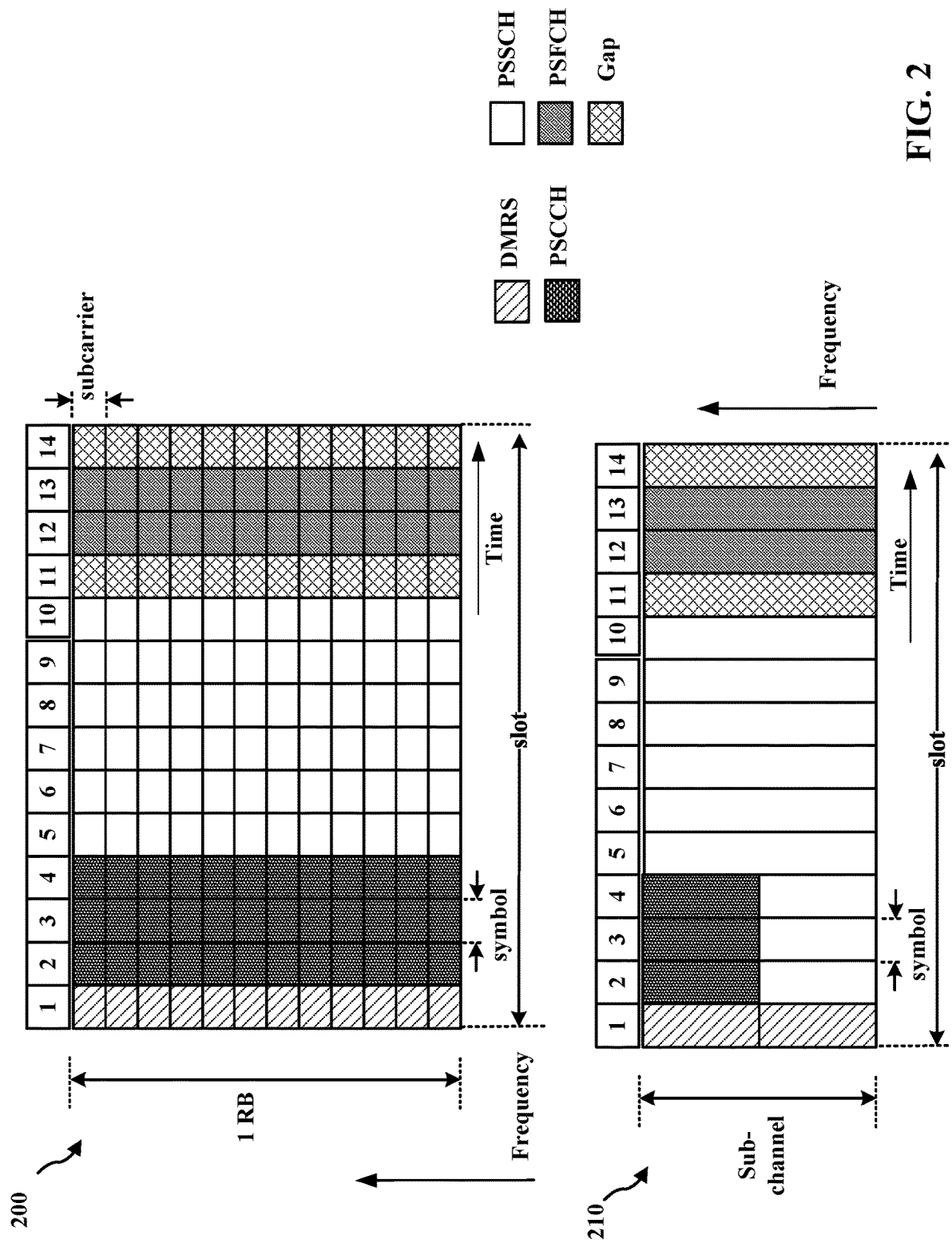
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

Figure 3:
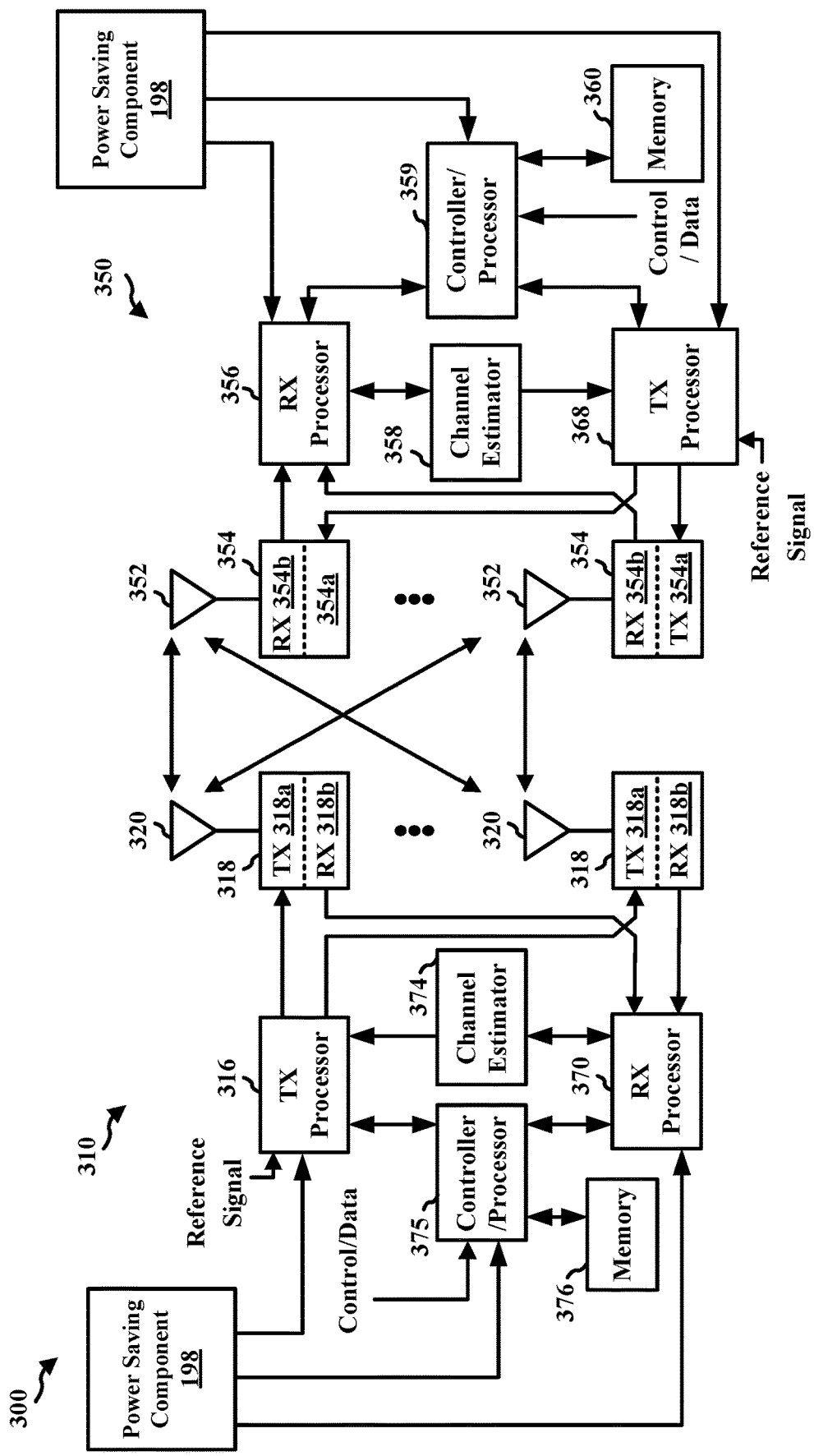
FIG. 3 is a diagram illustrating an example of a base station and user equipment (UE) in an access network.

FIG. 3 is a block diagram 300 of a first wireless communication device 310 in communication with a second wireless communication device 350. The communication may be based on sidelink or an access link. In some examples, the wireless communication devices 310, 350 may communicate based on V2X or other D2D communication. In other aspects, the wireless communication devices 310, 350 may communicate over an access link based on uplink and downlink transmissions. The communication may be based on sidelink using a PC5 interface (e.g., between two UEs). The communication may be based on an access link using a Uu interface (e.g., between a base station and a UE). The wireless communication devices 310, 350 may include a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The transmission is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368 or the TX processor 316, the RX processor 356 or the RX processor 370, and the controller/processor 359 or the controller/processor 375 may be configured to perform aspects in connection with the power saving component 198 of FIG. 1.

Figure 4:
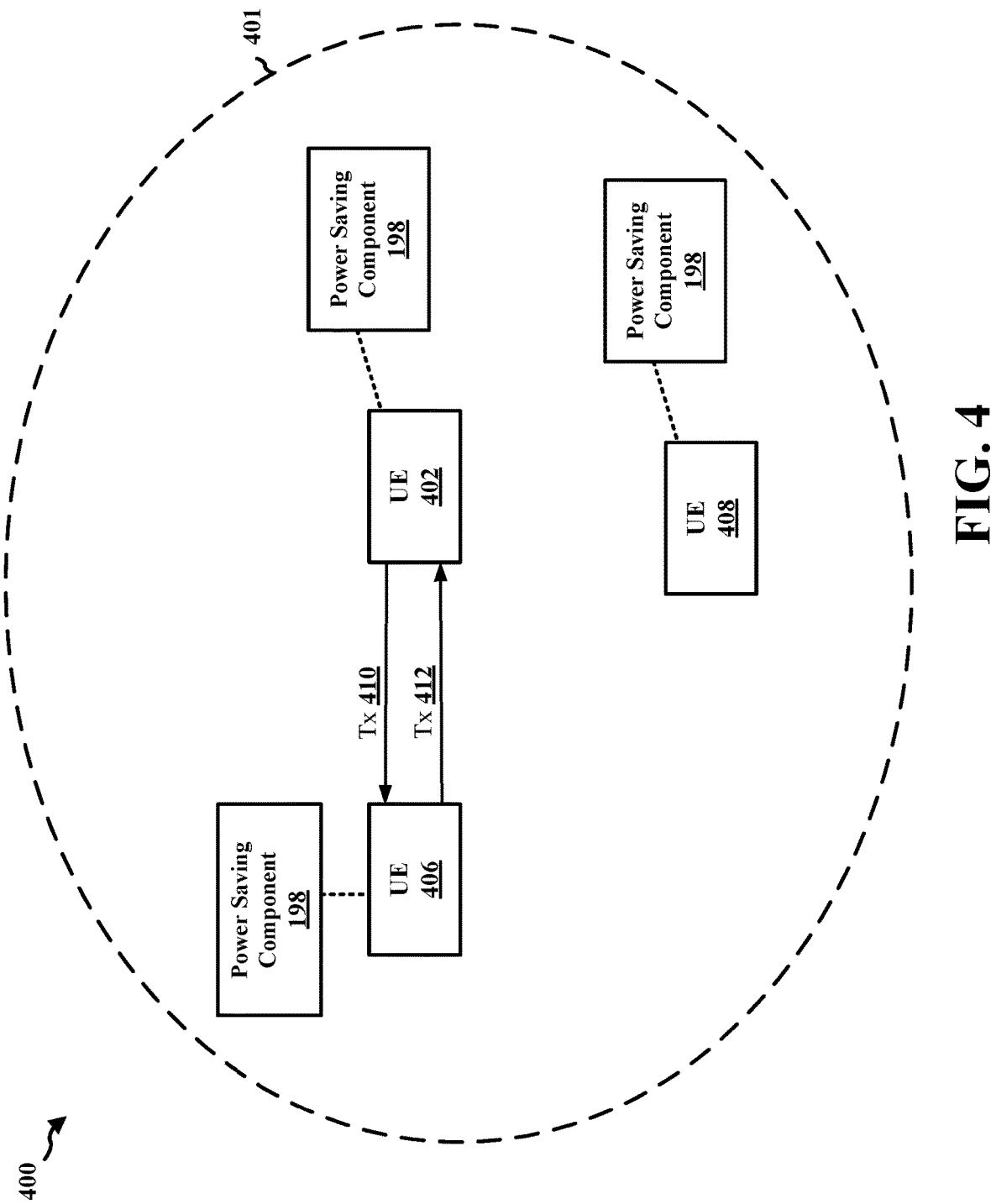
FIG. 4 illustrates example aspects of sidelink communication between devices, in accordance with aspects presented herein.

FIG. 4 illustrates an example 400 of sidelink communication between devices, as presented herein. The communication may be based on a slot structure including aspects described in connection with FIG. 2 or another sidelink structure. For example, a first UE 402 may transmit a sidelink transmission 410, e.g., including a control channel (e.g., PSCCH) and/or a corresponding data channel (e.g., PSSCH), that may be received by a second UE 406 and/or a third UE 408. The sidelink transmission 410 may be received directly from the first UE 402, e.g., without being transmitting through a base station.

The first UE 402, the second UE 406, and/or the third UE 408 may each be capable of operating as a transmitting device in addition to operating as a receiving device. Thus, the second UE 406 is illustrated as transmitting a sidelink transmission 412 that is received by the first UE 402. One or more of the sidelink transmissions 410, 412 may be broadcast or multicast to nearby devices. For example, the first UE 402 may transmit communications intended for receipt by other UEs within a range 401 of the first UE 402. In other examples, one or more of the sidelink transmissions 410, 412 may be groupcast to nearby devices that are a member of a group. In other examples, one or more of the sidelink transmissions 410, 412 may be unicast from one UE to another UE.

A sidelink transmission may provide sidelink control information (SCI) including information to facilitate decoding the corresponding data channel. For example, a transmitting device (sometimes referred to as an "originating device," a "transmitting UE", or an "originating UE") may transmit SCI including information that a receiving device (sometimes referred to as a "target device," a "receiving UE," or a "target UE") may use to avoid interference. For example, the SCI may indicate reserved time resources and/or reserved frequency resources that will be occupied by the data transmission, and may be indicated in a control message from the transmitting device. The number of TTIs, as well as the RBs that will be occupied by the data transmission, may be indicated in a control message from the first UE 402. In some examples, the SCI may be used by a receiving device to avoid interference by refraining from transmitting on the occupied resources during a data transmission.

One or more of the first UE 402, the second UE 406, and/or the third UE 408 may include a power saving component, similar to the power saving component 198 described in connection with FIG. 1.

Sidelink communication enables a first UE to communicate with another UE directly. For example, the first UE and the other UE may communicate without routing the communication through a base station. Sidelink may be beneficial for vehicle-based communications (e.g., V2V, V2I, V2N, V2P, C-V2X, etc.) that allows a vehicle UE to communicate directly with another UE or a pedestrian UE. When dealing with V2X communication, power consumption by the vehicle UE might not be a concern.

However, it may be beneficial to implement power saving modes for non-vehicular applications of sidelink or for some vehicular applications. Two examples of power saving modes include partial sensing or random selection and discontinuous reception (DRX). Partial sensing may be implemented at the physical layer of the protocol stack, and DRX may be implemented at the MAC layer of the protocol stack.

Sidelink communication may be based on different types or modes of resource allocation mechanisms. In a first resource allocation mode (which may be referred to herein as "Mode 1"), centralized resource allocation may be provided by a network entity. For example, and referring to the example of FIG. 1, a base station 102/180 may determine resources for sidelink communication and may allocate resources to different UEs to use for sidelink transmissions. In this first mode, a UE receives the allocation of sidelink resources from the base station 102/180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether a selected sidelink resource has been reserved by other UE(s) before selecting the sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
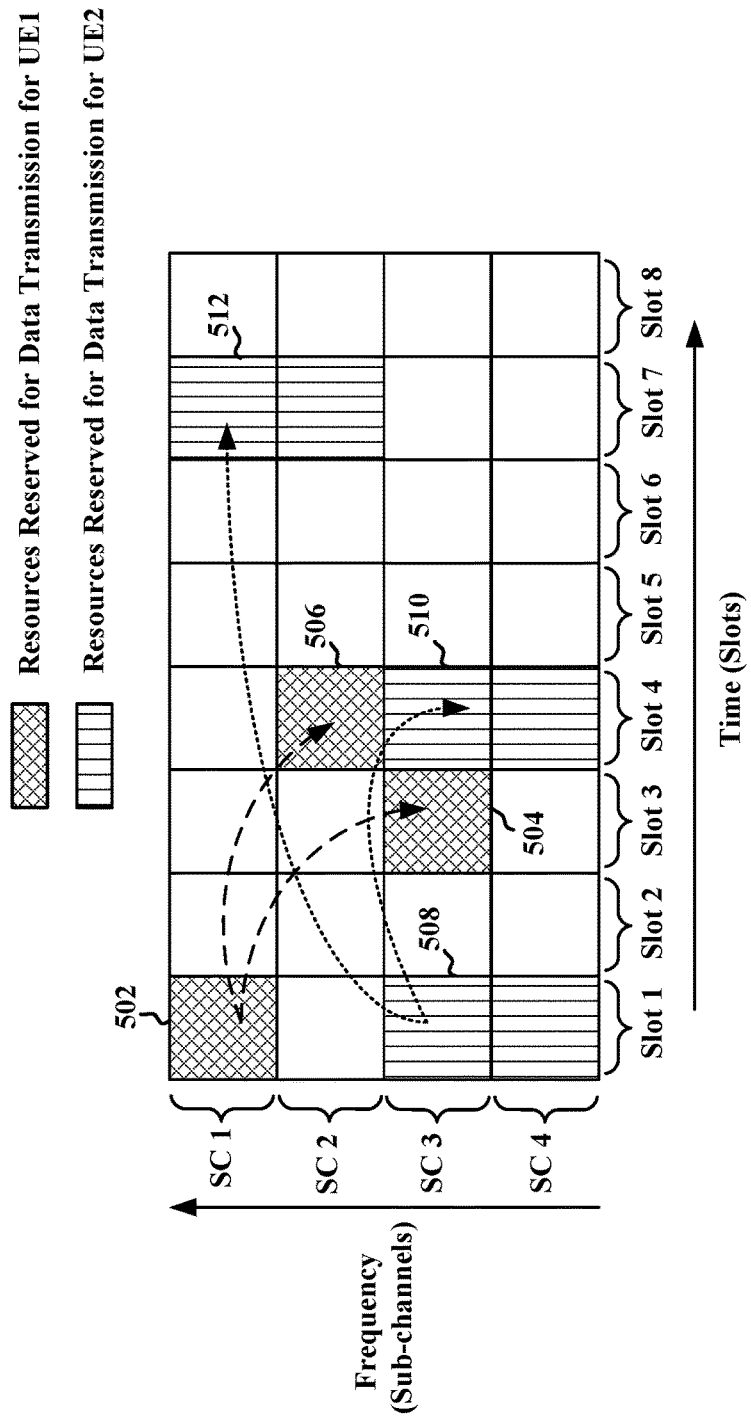
FIG. 5 illustrates examples of resource reservation for sidelink communication.

FIG. 5 is an example 500 of time and frequency resources showing reservations for sidelink transmissions, as presented herein. The resources may be included in a sidelink resource pool, for example. The resource allocation for each UE may be in units of one or more sub-channels in the frequency domain (e.g., sub-channels SC1 to SC 4), and may be based on one slot in the time domain (e.g., slots 1 to 8). The UE may also use resources in the current slot to perform an initial transmission, and may reserve resources in future slots for retransmissions. In the illustrated example of FIG. 5, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1) may reserve a sub-channel (e.g., SC 1) in a current slot (e.g., slot 1) for its initial data transmission 502, and may reserve additional future slots within the window for data retransmissions (e.g., a first data retransmission 504 and a second data retransmission 506). For example, the first UE may reserve sub-channels SC 3 at slot 3 and SC 2 at slot 4 for future retransmissions as shown by FIG. 5. The first UE then transmits information regarding which resources are being used and/or reserved by it to other UE(s). The first UE may do so by including the reservation information in a reservation resource field of the SCI, e.g., a first stage SCI.

FIG. 5 illustrates that a second UE ("UE2") reserves resources in sub-channels SC 3 and SC 4 at slot 1 for a current data transmission 508, reserves a first data retransmission 510 at slot 4 using sub-channels SC 3 and SC 4, and reserves a second data retransmission 512 at slot 7 using sub-channels SC 1 and SC 2, as shown by FIG. 5. Similarly, the second UE may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, the UE may determine a set of candidate resources (e.g., by monitoring SCI from other UEs and removing resources from the set of candidate resources that are reserved by other UEs in a signal for which the UE measures an RSRP above a threshold value). The UE may also select N resources for transmissions and/or retransmissions of a TB. As an example, the UE may randomly select the N resources from the set of candidate resources previously determined. For each transmission, the UE may reserve future time and frequency resources for an initial transmission and up to two retransmissions. The UE may reserve the resources by transmitting SCI indicating the resource reservation. For example, in the example in FIG. 5, the second UE may transmit SCI reserving resources for the current data transmission 508, the first data retransmission 510, and the second data retransmission 512.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

Figure 6:
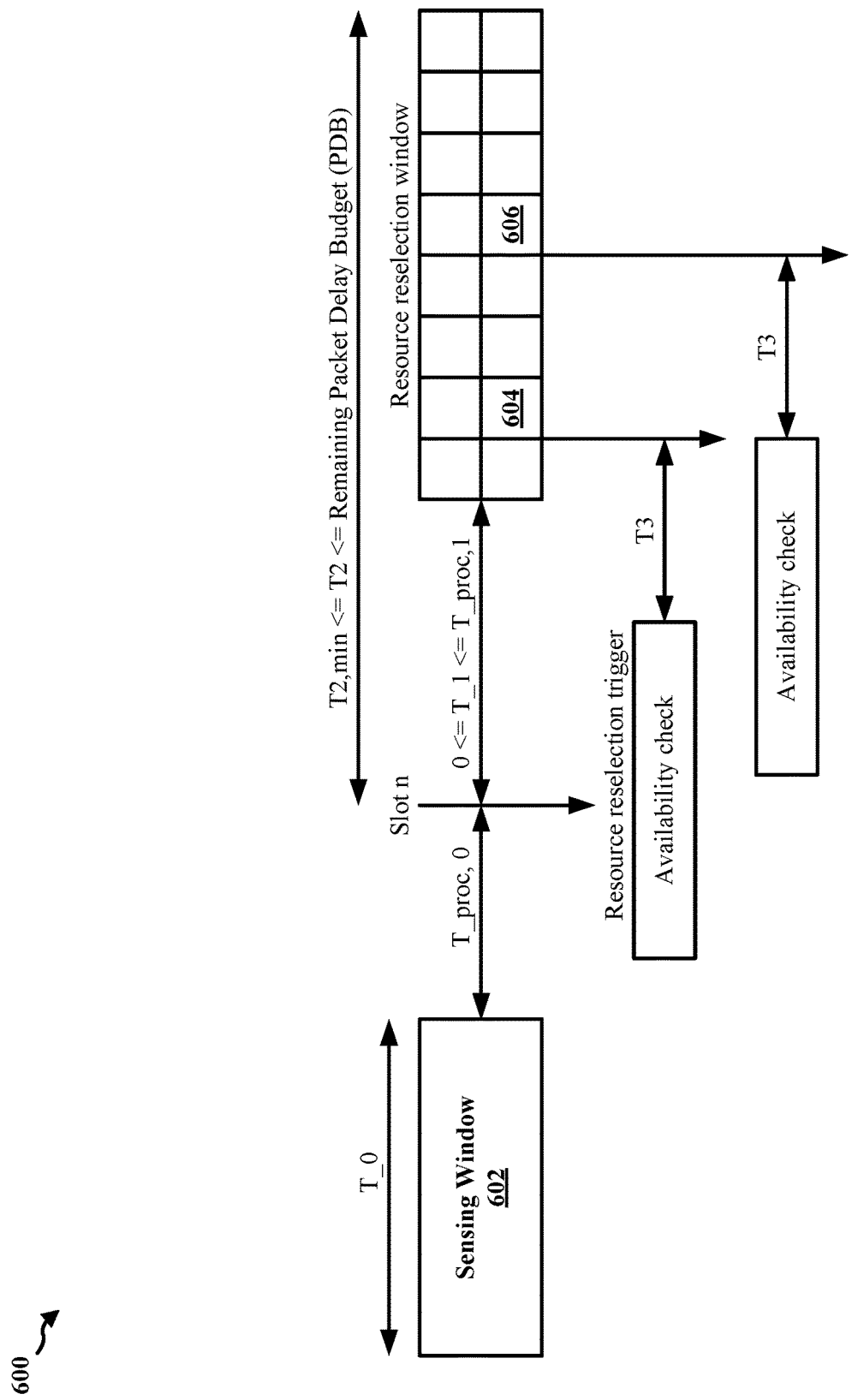
FIG. 6 is a diagram illustrating a timing diagram for a wireless device employing a partial sensing mechanism.

In the resource allocation mode 2, a higher layer may request the UE 104 that includes the power saving component 198 to determine a subset of resources from which the higher layer may select resources for PSSCH/PSCCH transmissions. FIG. 6 illustrates an example timing diagram 600 for a UE that may be triggered to select a resource for sidelink transmission at slot n. The timing diagram shows a timing for sensing for resource reservations from other UEs, such as the resource reservations described in connection with FIG. 5. As an example, the trigger may include having data for transmission. Although FIG. 6 is described in connection with a UE, the resource selection may also be applied by other sidelink devices. In response to the trigger at slot n, the UE may consider signals received within a sensing window 602 of duration T_0 and determine information (e.g., SCI with resource reservations) received within the sensing window 602. For example, the UE may determine which resources were used by other UE(s) or reserved by other UE(s) during the sensing window 602. The UE may anticipate that the previously used resources may also be used by the other UE in the future (e.g., during or after slot n). A signal received in the sensing window may include SCI indicating a resource reservation for a resource within the resource selection window following slot n. Based on the past use of resources and/or the reservation of resources (e.g., the "sensing" of resources), the UE may determine which resources are scheduled for use and/or determine which resources are not scheduled for use. For example, based on the sensing of the resources during the sensing window 602, the UE may determine that a first resource 604 and a second resource 606 may be reserved during the slot n and/or during a future slot. The UE may exclude candidate resources that are reserved by other UEs from a candidate set of resources when selecting a sidelink transmission resource. In some examples, the UE may exclude candidate resources that are reserved by another UE and that meet one or more conditions, such as the reservation signal meeting an RSRP threshold.

To trigger resource selection at the slot n, a higher layer may provide a number of parameters, such as a minimum duration for a selection window t2min_SelectionWindow (internal $T_{2min}$ may be set to a corresponding value from higher layer parameter t2min_SelectionWindow for a given value of $prio_{TX}$ that indicates configured priority $\{1, 5, 10, 20\} \cdot 2^\mu$ where $\mu$ may equal to 0, 1, 2, 3, for subcarrier spacing (SCS) 15, 30, 60, 120 kHz.

If $T_{2min}$ is shorter than a remaining packet delay budget (PDB) (in slots), then $T_2$ may be determined by the UE 104 and $T_{2min}$ may be less than or equal to $T_2$ which may be less than or equal to the remaining packet delay budget. If $T_{2min}$ is not shorter than a remaining packet delay budget, resource selection window size $T_2$ may be set to the remaining packet delay budget. The parameters may further include a t0_SensingWindow where an internal parameter $T_0$ indicating the sensing window size (which may correspond with T_0 in FIG. 6) that may be the number of slots corresponding to t0_SensingWindow ms. The sensing window may be defined by a range of slots $[n-T_0, n-T_{proc,0}^{SL})$ where $T_{proc,0}^{SL}$ (which may correspond with T_proc, 0 in FIG. 6) may be defined. The UE may monitor slots which may belong to a sidelink resource pool within the sensing window except for those in which its own transmissions occur. In some aspects, $T_{proc,0}^{SL}$ may be determined based on SCS. For example, SCS configuration for the bandwidth part (BWP) $\mu_{sl}=0$ may correspond to $T_{proc,0}^{SL}=1$ (slot), $\mu_{sl}=1$ may correspond to $T_{proc,0}^{SL}=1$ (slot), $\mu_{sl}=2$ may correspond to $T_{proc,0}^{SL}=2$ (slots), $\mu_{sl}=3$ may correspond to $T_{proc,0}^{SL}=4$ (slots), or the like. T1 (which may correspond with T_1 in FIG. 6) indicating delay between the slot n and the resource selection may be determined by the UE and may satisfy $0 \leq T1 \leq T_{proc,1}^{SL}$ (T_proc,1 in FIG. 5). In some aspects, $T_{proc,1}^{SL}$ may be set based on SCS, such as $\mu_{sl}$. For example, $\mu_{sl}=0$ may correspond to $T_{proc,1}^{SL}=3$ (slots), $\mu_{sl}=1$ may correspond to $T_{proc,1}^{SL}=5$ (slots), $\mu_{sl}=2$ may correspond to $T_{proc,1}^{SL}=9$ (slots), $\mu_{sl}=3$ may correspond to $T_{proc,1}^{SL}=17$ (slots), or the like.

Figure 7A:
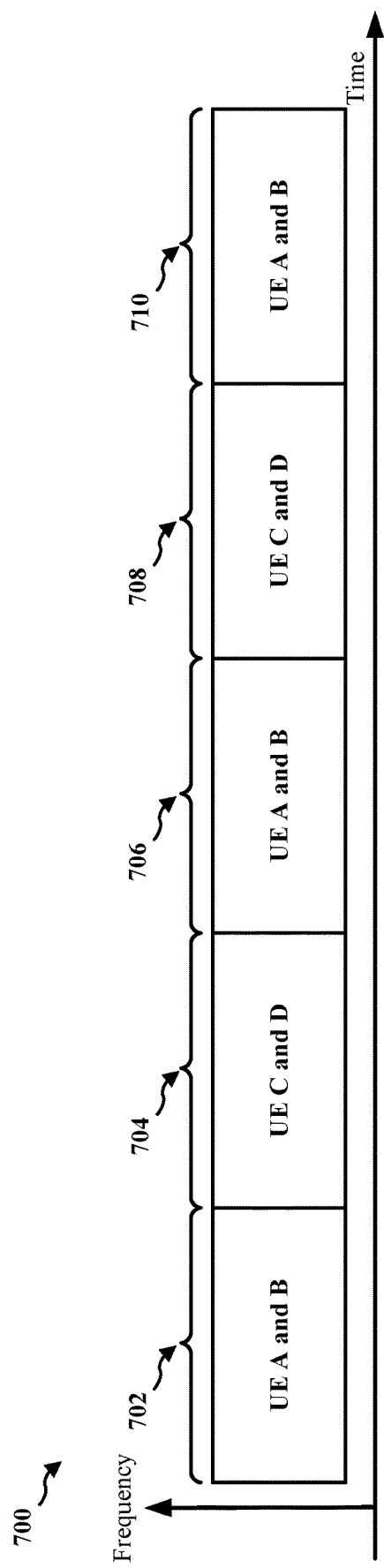
FIG. 7A is a diagram illustrating a resource pool including periodic on-durations of a power saving mode, in accordance with the teachings disclosed herein.

UEs may use two schemes for power saving, DRX and resource allocation mode 2 with partial sensing. Partial sensing may include the UE performing a sensing operation discontinuously, e.g., sensing during a duration of time (e.g., an ON duration) and skipping sensing during a duration of time (e.g., an OFF duration) in a periodic manner. In DRX, the UE may skip monitoring for sidelink communication (e.g., including SCI) or may transition to a low power mode during an OFF duration and may monitor for sidelink communication during an ON duration. Under both schemes, the power use of UE may be reduced, i.e., a UE may only perform sensing, transmission and reception over a period of time and is sleep for the remainder of time. FIG. 7A illustrates a resource pool 700 including a sequence of on-durations during which different sets of UEs are operating in the on-duration. In the illustrated example of FIG. 7A, the frequency domain is represented along a vertical axis and the time domain is represented along a horizontal axis.

As shown in FIG. 7A, one or more UEs that may communicate (e.g., using sidelink) are active during an on-duration and then go to sleep during an off-duration. For example, during a first on-duration 702, a first pair of UEs (e.g., a UE A and a UE B) may operate in an awake state to sense, reserve resources, and transmit to each other and then transition to a sleep state at the end of the first on-duration 702. During a second on-duration 704, the first pair of UEs may continue operating in the sleep state, and a second pair of UEs (e.g. a UE C and a UE D) may transition to the awake state. As shown in FIG. 7A, the first pair of UEs (e.g., the UE A and the UE B) operate in the awake state during the first on-duration 702, a third on-duration 706, and a fifth on-duration 710, and operate in the sleep state during the second on-duration 704 and the fourth on-duration 708. In a similar manner, the second pair of UEs (e.g., the UE C and the UE D) operate in the awake state during the second on-duration 704 and the fourth on-duration 708, and operate in the sleep state during the first on-duration 702, the third on-duration 706, and the fifth on-duration 710. By operating in the sleep state when not communicating, the respective UEs may conserve power.

Figure 7B:
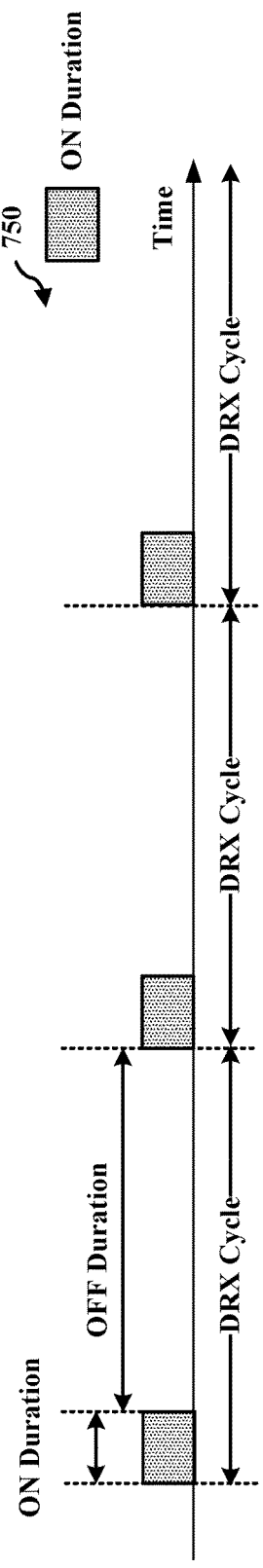
FIG. 7B illustrates example aspects of discontinuous reception (DRX), in accordance with aspects disclosed herein.
Figure 7C:
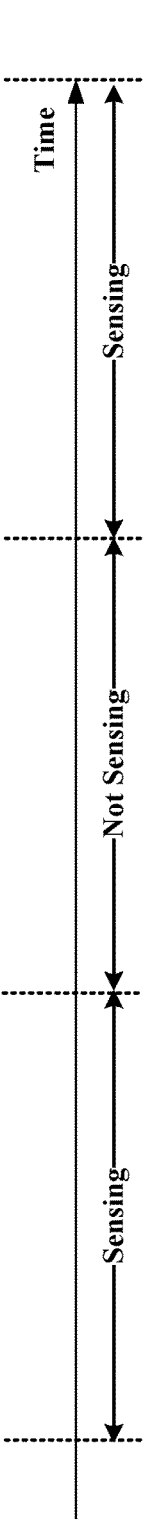
FIG. 7C illustrates example aspects of partial sensing, in accordance with aspects disclosed herein.

It may be appreciated that the on-durations during which a UE is operating in an awake state may be referred to as a "partial sensing pattern" when the UE is implementing a partial sensing mechanism or may be referred to as a "DRX pattern" when the UE is implementing a DRX mechanism. FIG. 7B illustrates an example of a DRX cycle 750. In a DRX configuration, the UE may monitor for communication in a discontinuous manner over time. For example, the UE may receive, transmit, and/or sense during a DRX ON duration, and may skip transmission, reception, or sensing during a DRX OFF duration. The UE may enter a sleep mode or a low power mode during the DRX OFF duration, in which the UE minimizes power consumption by shutting down a radio frequency (RF) function without detecting communication from the base station. FIG. 7C illustrates an example of a partial sensing pattern 775 in which the UE performs sensing, e.g., as described in connection with FIG. 6, in a discontinuous manner. The UE may perform sensing during periodic durations that are separated in time by durations during which the UE may not perform sensing. Thus, the UE may perform sensing for sidelink resource reservations from other UEs during the sensing duration and may skip sensing for the sidelink resource reservations from the other UEs during the non-sensing duration.

In some examples, the resources of the resources pool may be defined for synchronization purposes using a global power saving pattern (e.g., a "system-wide" DRX pattern or a "system-wide" partial sensing pattern). For example, the global power saving pattern may define the one or more resources during which the first pair of UEs are to operate in the awake state (e.g., the first on-duration 702, the third on-duration 706, and the third on-duration 710 for the UE A and the UE B). In some such examples, the global power saving pattern may define the one or more resources during which the second pair of UEs are to operate in the awake state (e.g., the on-durations for the UE C and the UE D) to be the same as the on-durations for the first pair of UEs (e.g., the first on-duration 702, the third on-duration 706, and the third on-duration 710) or to be orthogonal to the on-durations for the first pair of UEs (e.g., the on-durations second pair of UEs may be the second on-duration 704 and the fourth on-duration 708).

As shown in FIG. 7C, in some examples, a UE (or a pair of UEs) may operate in an awake state during some periods and may operate in a sleep state during other periods. For a UE configured with a power saving mode, the UE may reserve resources for a future transmission that may fall outside the on-duration of the UE.

Figure 8:
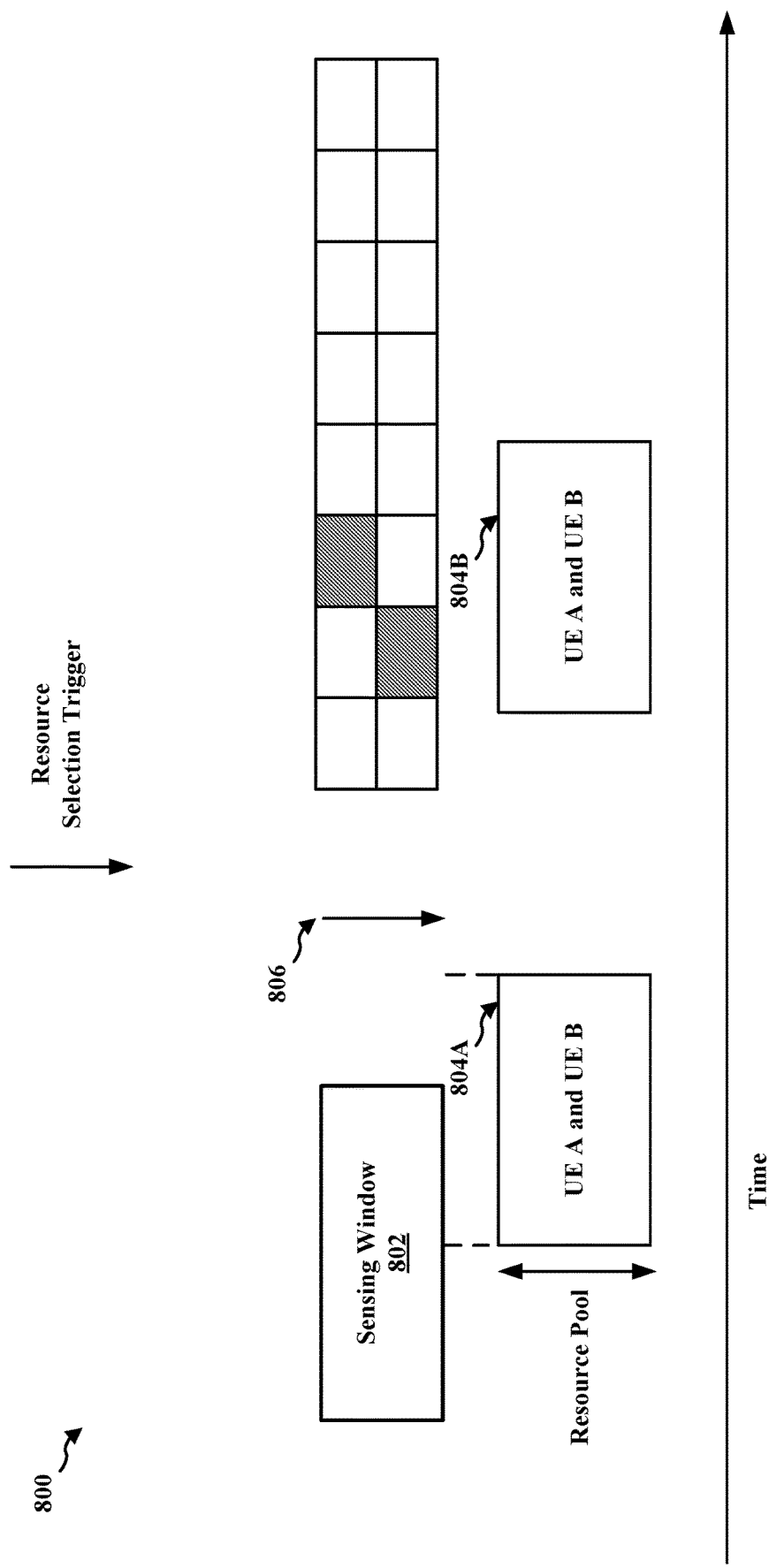
FIG. 8 is a diagram illustrating timing of ON durations, sensing windows, and resource selection triggers, in accordance with the teachings disclosed herein.

In some aspects, resource triggering by an upper layer may happen during the ON duration or the OFF duration for UEs as illustrated in example 800 in FIG. 8. For example, a portion of a sensing window 802 may happen outside a DRX ON duration 804A or a DRX ON duration 804B. Similarly, a resource selection trigger 806 may also be transmitted outside the DRX ON durations 804A or 804B. Providing resource selection trigger 806 or the sensing window 802 outside the DRX ON duration may result in extra power consumption. Moreover, if the resource selection occurred selects resources outside a DRX ON duration for a receiving UE, a transmission on the resources may not be successfully received. Aspects provided herein provide coherent configurations where various partial sensing related parameters, such as timing of such as delay between resource selection and resource allocation window $T_1$, sensing window's size $T_0$, resource selection window size $T_2$, or the like may be determined based on a DRX ON duration or a DRX OFF duration. The upper layer may be user plane upper layers.

Figure 9:
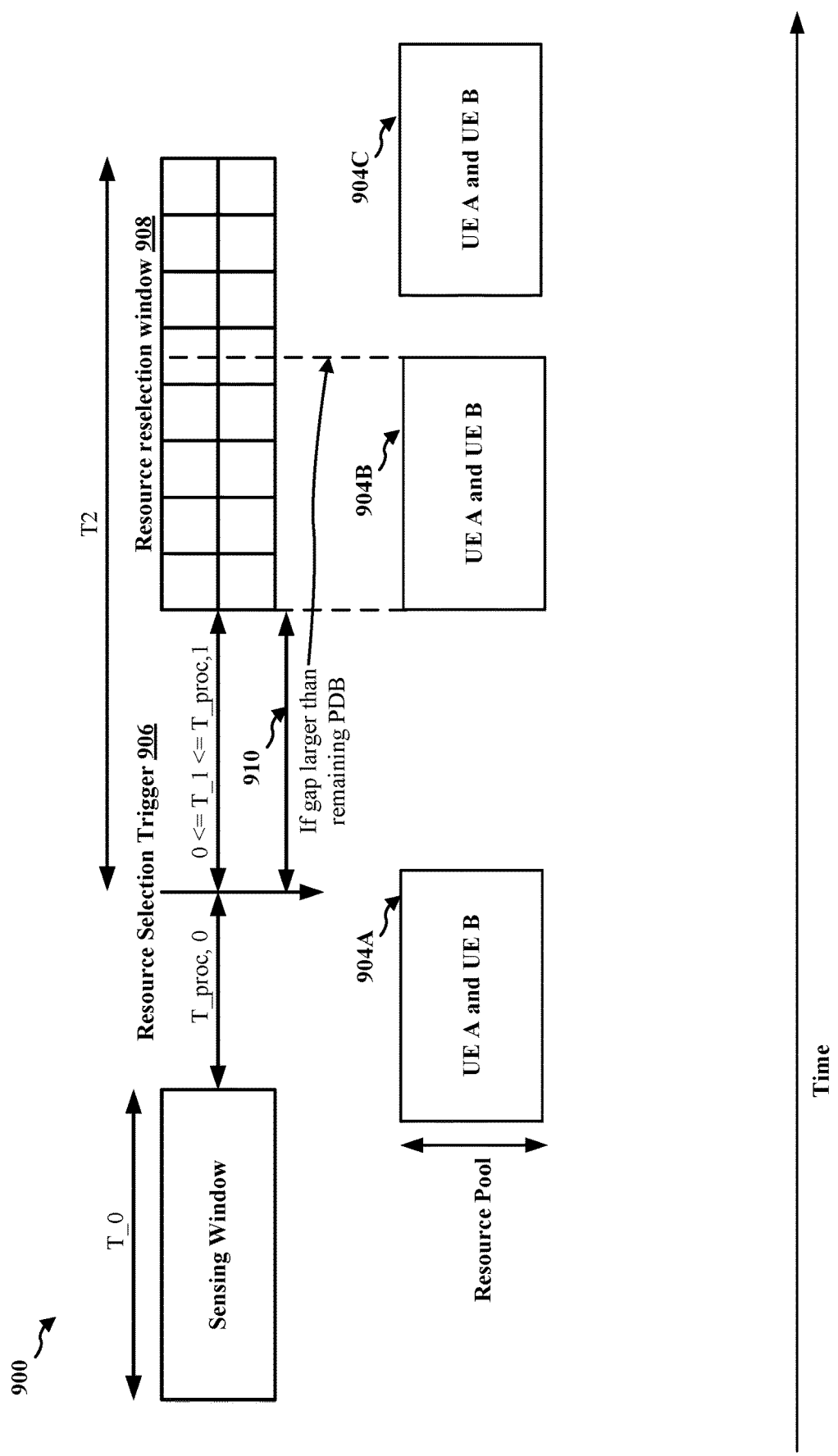
FIG. 9 is a diagram illustrating timing of ON durations, sensing windows, and resource selection triggers, in accordance with the teachings disclosed herein.

In some aspects, as illustrated in example 900 of FIG. 9, the resource allocation window $T_1$ may be determined based on the ON/OFF duration of the UE or a receiving UE. For example, if the upper layer instructs a UE to select resources at a slot n (resource selection trigger 906), such that slot $n+T_{proc,1}^{SL}$ is outside of the ON duration 904A, the selection window 908 for a UE may start from the beginning of the next ON duration 904B. The ON duration 904A and the ON duration 904B may correspond with an ON duration of a receiving UE.

In some aspects, the UE's sensing window size $T_0$ may be determined based on the ON/OFF duration. For example, in some aspects, $T_0$ may be determined based on $T_0$ slots in the past ending at $n+T_{proc,0}^{SL}$ regardless of whether they are within a UE's ON or OFF duration. In such aspects, the slots falling outside of a UE's ON duration may not be used to determine the set of resource candidates within the selection window. In some aspects, $T_0$ may be determined based on $T_0$ slots in the past including the slots within the UE's ON duration.

In some aspects, if the upper layer instructs a UE to select a set of resources at slot n during the ON duration such that the UE's selection window is partially in the current ON duration, a UE can select a set of resources from the current ON duration or the next ON duration or both. In some aspects, the selection window may span multiple ON durations 904B and 904C. In some aspects, if the gap 910 between slot n and the beginning of the next ON duration is larger than the remaining PDB, then T2 may be set to be smaller than or equal to the number of slots remained in the current ON duration 904B.

Figure 10:
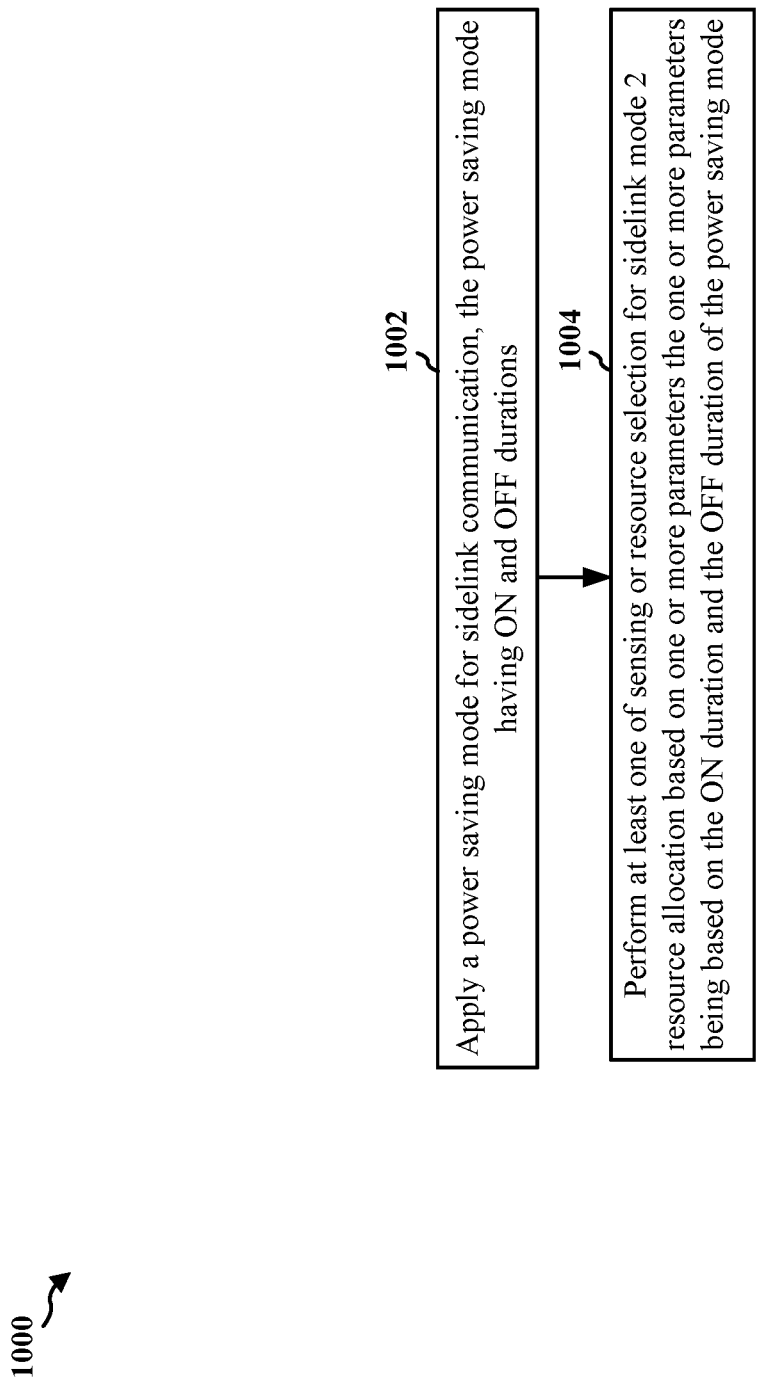
FIG. 10 is a flowchart of a method of wireless communication.

FIG. 10 is a flowchart 1000 of a method of wireless communication. method may be performed by a wireless device (e.g., the UE 104, the UE 408, the apparatus 1202). The method enables the wireless device to apply a power saving mode for sidelink communication with configurable sensing based sidelink resource selection.

At 1002, the wireless device applies a power saving mode for sidelink communication, the power saving mode having an ON duration and an OFF duration. For example, applying 1002 may be performed by power saving mode component 1242 of FIG. 12. As one example, the UE 402 may apply a power saving mode for sidelink communication. In some aspects, the power saving mode is based on a partial sensing mode. In some aspects, the power saving mode is based on DRX of the first wireless device or a second wireless device. The ON duration and the OFF duration may be periodic or aperiodic. Aspects of DRX and partial sensing are described in connection with FIGS. 8 and 9.

At 1004, the wireless device performs at least one of sensing or resource selection for sidelink mode 2 resource allocation based on one or more parameters, the one or more parameters being based on the ON duration and the OFF duration of the power saving mode. The one or more parameters may include the resource allocation window and the sensing window size, or a timing associated with the resource allocation window or the sensing window. As one example, the UE 402 may perform at least one of sensing or resource selection for sidelink mode 2 resource allocation based on one or more parameters. The sensing based sidelink resource selection may also be referred to as decentralized sidelink resource allocation or mode 2 sidelink resource allocation. Example aspects of sensing based sidelink resource allocation are described in connection with FIG. 6. For example, performance 1004 may be performed by perform component 1244 of FIG. 12. In some aspects, if a sidelink resource selection window is triggered at a slot during a current ON duration, and if the current ON duration at partially overlaps the sidelink resource selection window, the wireless device selects a set of resources from one or more of the current ON duration or a next ON duration. In some aspects, the sidelink resource selection window spans multiple ON durations and the wireless device selects the set of resources from the current ON duration and the next ON duration. In some aspects, the wireless device selects the set of resources from the current ON duration if a gap between the slot in which the resource selection is triggered and a beginning of the next ON duration is larger than a remaining packet delay budget.

Figure 11:
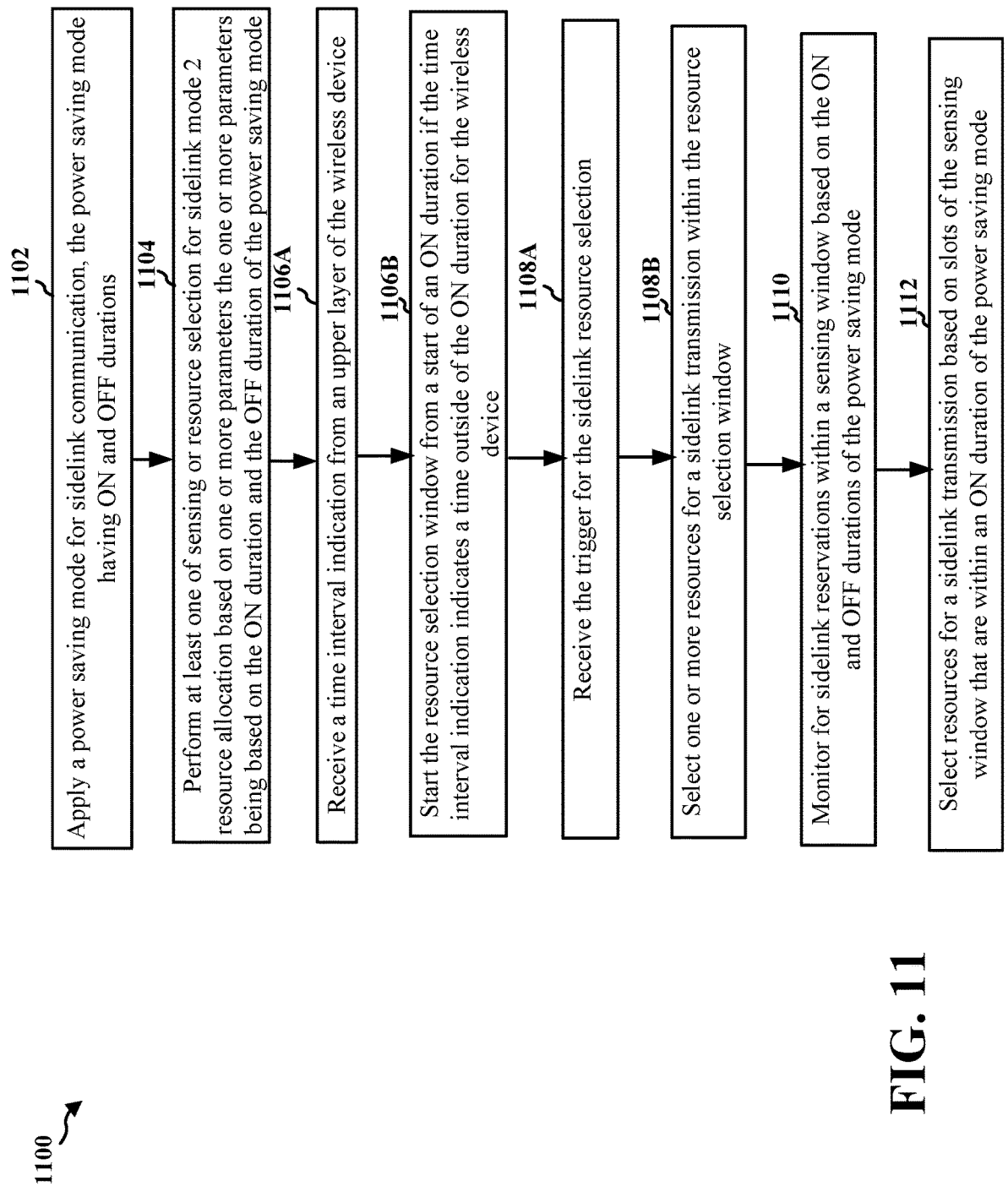
FIG. 11 is a flowchart of a method of wireless communication.

FIG. 11 is a flowchart 1100 of a method of wireless communication. method may be performed by a wireless device (e.g., the UE 104, the UE 408, the apparatus 1202 The method enables the wireless device to apply a power saving mode for sidelink communication with configurable sensing based sidelink resource selection.

At 1102, the wireless device applies a power saving mode for sidelink communication, the power saving mode having an ON duration and an OFF duration. For example, applying 1102 may be performed by power saving mode component 1242 of FIG. 12. As one example, the UE 402 may apply a power saving mode for sidelink communication. In some aspects, the power saving mode is based on a partial sensing mode. In some aspects, the power saving mode is based on DRX of the first wireless device or a second wireless device. The ON duration and the OFF duration may be periodic or aperiodic. Aspects of DRX and partial sensing are described in connection with FIGS. 8 and 9.

At 1104, the wireless device performs at least one of sensing or resource selection for sidelink mode 2 resource allocation based on one or more parameters, the one or more parameters being based on the ON duration and the OFF duration of the power saving mode. The one or more parameters may include the resource allocation window and the sensing window size, or a timing associated with the resource allocation window or the sensing window. As one example, the UE 402 may perform at least one of sensing or resource selection for sidelink mode 2 resource allocation based on one or more parameters. The sensing based sidelink resource selection may also be referred to as decentralized sidelink resource allocation or mode 2 sidelink resource allocation. Example aspects of sensing based sidelink resource allocation are described in connection with FIG. 6. For example, performance 1104 may be performed by perform component 1244 of FIG. 12. In some aspects, if a sidelink resource selection window is triggered at a slot during a current ON duration, and if the current ON duration at partially overlaps the sidelink resource selection window, the wireless device selects a set of resources from one or more of the current ON duration or a next ON duration. In some aspects, the sidelink resource selection window spans multiple ON durations and the wireless device selects the set of resources from the current ON duration and the next ON duration. In some aspects, the wireless device selects the set of resources from the current ON duration if a gap between the slot in which the resource selection is triggered and a beginning of the next ON duration is larger than a remaining packet delay budget. In some aspects, the resource selection window does not include resources that are outside the ON durations. In some aspects, the resource selection window does not include resources that are within OFF durations.

In some aspects, at 1106A, the wireless device receives a time interval indication from an upper layer of the wireless device. In some aspects, at 1106B, the wireless device starts the resource selection window from a start of an ON duration if the time interval indication indicates a time outside of an ON duration for the wireless device. For example, reception 1106A and starting 1106B may be performed by indication processing component 1246 of FIG. 12. As one example, the UE 402 may receive a time interval indication from an upper layer of the wireless device or start the resource selection window from a start of an ON duration if the time interval indication indicates a time outside of an ON duration for the wireless device. In some aspect, a first duration associated with the sensing window for the power saving mode is different from a second duration associated with a second power mode based on an upper layer configuration.

In some aspects, the wireless device determines a time interval between a trigger for sidelink resource selection and a beginning of a resource selection window based, at least in part, on the ON duration and the OFF duration of the power saving mode. In some aspects, at 1108A, the wireless device receives the trigger for the sidelink resource selection. In some aspects, at 1108B, the wireless device selects one or more resources for a sidelink transmission within the resource selection window. For example, reception 1108A and selection 1108B may be performed by trigger processing component 1248 of FIG. 12.

In some aspects, the wireless device does not select the resources for the sidelink transmission based on the slots of the sensing window that are outside of the ON duration of the power saving mode. As one example, the UE 402 may not select the resources for the sidelink transmission based on the slots of the sensing window that are outside of the ON duration of the power saving mode. For example, the wireless device may refrain from selecting, or avoid selecting, the resources based on slots of the sensing window that are outside of the ON duration. In some aspects, the sensing window includes a number of slots that overlap with one or more ON durations of the power saving mode. In some aspects, the sensing window does not include slots during OFF durations of the power saving mode. In some aspects, an upper layer of the wireless device sets a different duration of the sensing window for a power saving mode and a different power mode.

In some aspects, at 1110, the wireless device monitors for sidelink reservations within a sensing window based on the ON duration and the OFF duration of the power saving mode. For example, monitoring 1110 may be performed by monitoring component 1250 of FIG. 12. As one example, the UE 402 may monitor for sidelink reservations within a sensing window based on the ON duration and the OFF duration of the power saving mode.

In some aspects, the sensing window has a duration for a number of slots. In some aspects, at 1112, the wireless device selects resources for a sidelink transmission based on slots of the sensing window that are within an ON duration of the power saving mode. As one example, the UE 402 may select resources for a sidelink transmission based on slots of the sensing window that are within an ON duration of the power saving mode. For example, selection 1112 may be performed by resource selection component 1252 of FIG. 12.

Figure 12:
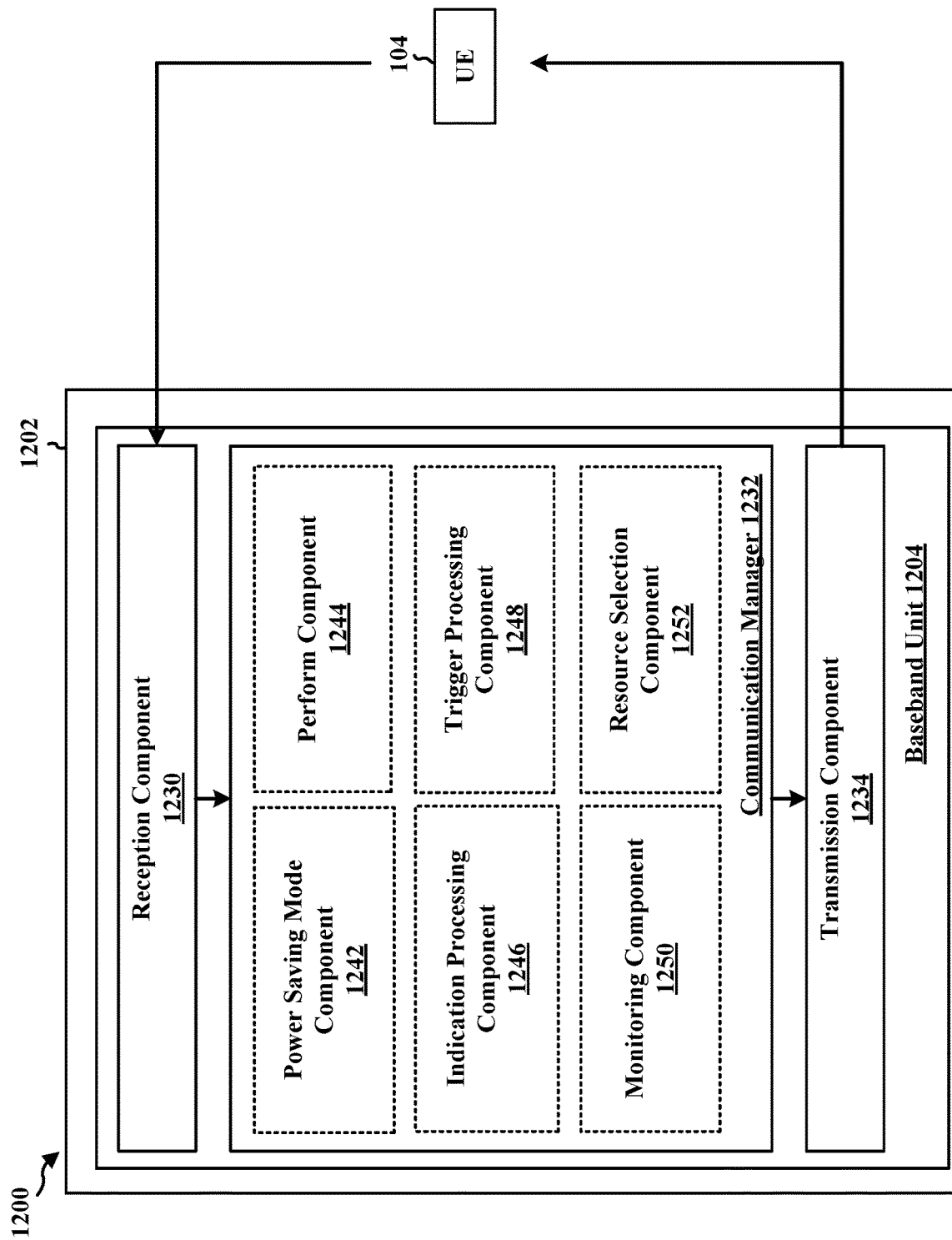
FIG. 12 is a diagram illustrating an example of a hardware implementation for an example apparatus.

FIG. 12 is a diagram 1200 illustrating an example of a hardware implementation for an apparatus 1202. The apparatus 1202 is a wireless device and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the device 310/450 and may include the memory 360/376 and/or at least one of the TX processor 316/368, the RX processor 356/370, and the controller/processor 359/375.

The communication manager 1232 includes a power saving mode component 1242 that applies a power saving mode for sidelink communication, the power saving mode having an ON duration and an OFF duration, e.g., as described in connection with applying 1102 of FIG. 11.

The communication manager 1232 further includes a perform component 1244 that performs at least one of sensing or resource selection for sidelink mode 2 resource allocation based on one or more parameters, the one or more parameters being based on the ON duration and the OFF duration of the power saving mode, e.g., as described in connection with performance 1104 of FIG. 11.

In some aspects, the communication manager 1232 further includes an indication processing component 1246 that receives the trigger for the sidelink resource selection and selects one or more resources for a sidelink transmission within the resource selection window, e.g., as described in connection with reception 1108A and selection 1108B of FIG. 11.

In some aspects, the communication manager 1232 further includes a trigger processing component 1248 that receives the trigger for the sidelink resource selection and selects one or more resources for a sidelink transmission within the resource selection window, e.g., as described in connection with reception 1108A and starting 1108B of FIG. 11.

In some aspects, the communication manager 1232 further includes a monitoring component 1250 that monitors for sidelink reservations within a sensing window based on the ON duration and the OFF duration of the power saving mode, e.g., as described in connection with monitoring 1110 of FIG. 11.

In some aspects, the communication manager 1232 further includes a resource selection component 1252 that selects resources for a sidelink transmission based on slots of the sensing window that are within an ON duration of the power saving mode, e.g., as described in connection with selection 1112 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for applying a power saving mode for sidelink communication, the power saving mode having an ON duration and an OFF duration (e.g., the power saving mode component 1242 of the communication manager 1232 included in the baseband unit 1204). The baseband unit 1204 further includes means for performing at least one of sensing or resource selection for sidelink mode 2 resource allocation based on one or more parameters, the one or more parameters being based on the ON duration and the OFF duration of the power saving mode (e.g., the perform component 1244 of the communication manager 1232 included in the baseband unit 1204).

In some aspects, the baseband unit 1204 further includes means for receiving the trigger for the sidelink resource selection and selecting one or more resources for a sidelink transmission within the resource selection window (e.g., the trigger processing component 1248 of the communication manager 1232 included in the baseband unit 1204 and/or a transceiver).

In some aspects, the baseband unit 1204 further includes means for receiving a time interval indication from an upper layer of the wireless device and starting the resource selection window from a start of an ON duration if the time interval indication indicates a time outside of an ON duration for the wireless device (e.g., the indication processing component 1246 of the communication manager 1232 included in the baseband unit 1204 and/or a transceiver).

In some aspects, the baseband unit 1204 further includes means for monitoring for sidelink reservations within a sensing window based on the ON duration and the OFF duration of the power saving mode (e.g., the monitoring component 1250 of the communication manager 1232 included in the baseband unit 1204 and/or a transceiver).

In some aspects, the baseband unit 1204 further includes means for selecting resources for a sidelink transmission based on slots of the sensing window that are within an ON duration of the power saving mode (e.g., the resource selection component 1252 of the communication manager 1232 included in the baseband unit).

The aforementioned means may be one or more of the aforementioned components of the apparatus 1202 configured to perform the functions recited by the aforementioned means. As described supra, the apparatus 1202 may include the TX processor 316/368, the RX processor 356/370, and the controller/processor 359/375. As such, in one configuration, the aforementioned means may be the TX processor 316/368, the RX processor 356/370, and the controller/processor 359/375 configured to perform the functions recited by the aforementioned means.

The following examples are illustrative only and may be combined with other aspects or teachings described herein, without limitation.

Aspect 1 is a method of wireless communication at a first wireless device. The method includes applying a power saving mode for sidelink communication, the power saving mode having an ON duration and an OFF duration. The method further includes determining, based on the ON duration and the OFF duration of the power saving mode, one or more parameter for sensing based sidelink resource selection.

In aspect 2, the method of aspect 1 further includes that the power saving mode is based on a partial sensing mode.

In aspect 3, the method of aspect 1 or aspect 2 further includes that the power saving mode is based on DRX.

In aspect 4 is the method of any of aspects 1-3 further includes that the wireless device determines a time interval between a trigger for sidelink resource selection and a beginning of a resource selection window based, at least in part, on the ON duration and the OFF duration of the power saving mode. The method further includes receiving the trigger for the sidelink resource selection and selecting one or more resources for a sidelink transmission within the resource selection window.

In aspect 5 is the method of any of aspects 1-4 further includes receiving a time interval indication from an upper layer of the wireless device and starting the resource selection window from a start of an ON duration if the time interval indication indicates a time outside of an ON duration for the wireless device.

In aspect 6 is the method of any of aspects 1-5 further includes monitoring for sidelink reservations within a sensing window based on the ON duration and the OFF duration of the power saving mode.

In aspect 7 is the method of any of aspects 1-6 further includes that the sensing window has a duration for a number of slots. The method further includes selecting resources for an sidelink transmission based on slots of the sensing window that are within an ON duration of the power saving mode.

In aspect 8 is the method of any of aspects 1-7 further includes that the wireless device does not select the resources for the sidelink transmission based on the slots of the sensing window that are outside of the ON duration of the power saving mode.

In aspect 9 is the method of any of aspects 1-8 further includes that the sensing window includes a number of slots that overlap with one or more ON durations of the power saving mode.

In aspect 10 is the method of any of aspects 1-9 further includes that the sensing window exclude slots during OFF durations of the power saving mode.

In aspect 11 is the method of any of aspects 1-10 further includes that an upper layer of the wireless device sets a different duration of the sensing window for a power saving mode and a different power mode.

In aspect 12 is the method of any of aspects 1-11 further includes that if a sidelink resource selection window is triggered at a slot during a current ON duration, and if the current ON duration at least partially overlaps the sidelink resource selection window, the method further including selecting a set of resources from one or more of the current ON duration or a next ON duration.

In aspect 13 is the method of any of aspects 1-12 further includes that the sidelink resource selection window spans multiple ON durations and the wireless device selects the set of resources from the current ON duration and the next ON duration.

In aspect 14 is the method of any of aspects 1-13 further includes that the wireless device selects the set of resources from the current ON duration if a gap between the slot in which the resource selection is triggered and a beginning of the next ON duration is larger than a remaining packet delay budget.

Aspect 15 is an apparatus for wireless communication of a first wireless device. The apparatus includes a memory and at least one processor coupled to the memory and configured to perform the methods of any of aspects 1-14.

Aspect 16 is an apparatus for wireless communication of a first wireless device. The apparatus includes means for performing the methods of any of aspects 1-14.

Aspect 17 is a non-transitory computer-readable storage medium storing computer executable code, the code when executed by a processor cause the processor to perform the methods of any of aspects 1-14.

Aspect 18 is a method of wireless communication at a wireless device. The method includes applying a power saving mode for sidelink communication, the power saving mode having an ON duration and an OFF duration; and performing at least one of sensing or resource selection for sidelink mode 2 resource allocation based on one or more parameters, the one or more parameters being based on the ON duration and the OFF duration of the power saving mode.

In aspect 19, the method of aspect 18 further includes that the power saving mode is based on a partial sensing mode.

In aspect 20, the method of any of aspects 18-19 further includes that the power saving mode is based on DRX of the wireless device or a second wireless device.

In aspect 21, the method of any of aspects 18-20 further includes: receiving the trigger for sidelink resource selection; determining a time interval between a trigger for the sidelink resource selection and a beginning of a resource selection window based, at least in part, on the ON duration and the OFF duration of the power saving mode; and selecting one or more resources for a sidelink transmission within the resource selection window.

In aspect 22, the method of any of aspects 18-21 further includes: receiving a time interval indication from an upper layer of the wireless device; and starting the resource selection window from a start of the ON duration if the time interval indication indicates a time outside of the ON duration for the wireless device.

In aspect 23, the method of any of aspects 18-22 further includes: monitoring for sidelink reservations within a sensing window based on the ON duration and the OFF duration of the power saving mode.

In aspect 24, the method of any of aspects 18-23 further includes that the sensing window has a duration for a number of slots, the method further including: selecting resources for a sidelink transmission based on slots of the sensing window that are within the ON duration of the power saving mode.

In aspect 25, the method of any of aspects 18-24 further includes that the selecting the resources for the sidelink transmission includes excluding one or more resources that are outside of the ON duration of the power saving mode.

In aspect 26, the method of any of aspects 18-25 further includes that the sensing window includes a number of slots that overlap with one or more ON durations of the power saving mode.

In aspect 27, the method of any of aspects 18-26 further includes that the sensing window excludes slots during OFF durations of the power saving mode.

In aspect 28, the method of any of aspects 18-19 further includes that a first duration associated with the sensing window for the power saving mode is different from a second duration associated with a second power mode based on an upper layer configuration.

In aspect 29, the method of any of aspects 18-28 further includes: in response to a sidelink resource selection window being triggered at a slot during a current ON duration and the current ON duration at least partially overlapping the sidelink resource selection window, selecting a set of resources from one or more of the current ON duration or a next ON duration.

In aspect 30, the method of any of aspects 18-29 further includes that the sidelink resource selection window spans multiple ON durations including the current ON duration and the next ON duration.

In aspect 31, the method of any of aspects 18-30 further includes that the set of resources is from the current ON duration when a gap between the slot in which the resource selection is triggered and a beginning of the next ON duration is larger than a remaining packet delay budget.

In aspect 32, the method of any of aspects 18-31 where a resource selection window associated with the wireless device comprises first resources within the ON duration or second resources within a second ON duration.

In aspect 33, the method of any of aspects 18-32 further includes that the power saving mode is based on a partial sensing mode of the wireless device or DRX of the wireless device or a second wireless device.

In aspect 34, the method of any of aspects 18-33 further includes: receiving the trigger for sidelink resource selection; and selecting one or more resources for a sidelink transmission within the resource selection window.

In aspect 35, the method of any of aspects 18-34 further includes determining a time interval between a trigger for the sidelink resource selection and a beginning of a resource selection window based, at least in part, on the ON duration and the OFF duration of the power saving mode.

Aspect 36 is an apparatus for wireless communication of a first wireless device. The apparatus includes a memory and at least one processor coupled to the memory and configured to perform the methods of any of aspects 18-35.

Aspect 37 is an apparatus for wireless communication of a first wireless device. The apparatus includes means for performing the methods of any of aspects 18-35.

Aspect 38 is a non-transitory computer-readable storage medium storing computer executable code, the code when executed by a processor cause the processor to perform the methods of any of aspects 18-35.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:
    applying a power saving mode for sidelink communication, the power saving mode having an ON duration and an OFF duration;
    performing at least one of sensing or resource selection for sidelink mode 2 resource allocation based on one or more parameters, the one or more parameters being based on the ON duration or the OFF duration of the power saving mode; and
    in response to a sidelink resource selection window being triggered at a slot during a current ON duration, and the current ON duration at least partially overlapping with the sidelink resource selection window, selecting a set of resources from one or more of the current ON duration or a next ON duration, wherein the set of resources is from the current ON duration based on a gap between the slot and a beginning of the next ON duration being larger than a remaining packet delay budget.

2. The method of claim 1, wherein the power saving mode is based on a partial sensing mode of the wireless device or discontinuous reception (DRX) of the wireless device or a second wireless device.

3. The method of claim 1, wherein the sidelink resource selection window associated with the wireless device comprises a first set of one or more resources within the ON duration or a second set of one or more resources within a second ON duration.

4. The method of claim 1, further comprising:
    determining a time interval between a trigger for the sidelink resource selection and a beginning of the sidelink resource selection window based, at least in part, on the ON duration or the OFF duration of the power saving mode.

5. The method of claim 1, further comprising:
receiving a time interval indication from an upper layer of the wireless device; and
starting the sidelink resource selection window from a start of the ON duration in response to the time interval indication indicating a time interval outside of the ON duration for the wireless device.

6. The method of claim 1, further comprising:
monitoring for one or more sidelink reservations within a sensing window based on the ON duration or the OFF duration of the power saving mode.

7. The method of claim 6, wherein the sensing window has a duration for a number of slots, the method further comprising:
selecting one or more resources for a sidelink transmission based on slots of the sensing window that are within the ON duration of the power saving mode.

8. The method of claim 7, wherein the selecting the one or more resources for the sidelink transmission includes excluding one or more resources that are outside of the ON duration of the power saving mode.

9. The method of claim 6, wherein the sensing window comprises a number of slots that overlap with one or more ON durations of the power saving mode.

10. The method of claim 9, wherein the sensing window exclude slots during OFF durations of the power saving mode.

11. The method of claim 6, wherein an upper layer of the wireless device sets a different duration of the sensing window for the power saving mode and a different power mode.

12. The method of claim 1, wherein the sidelink resource selection window spans multiple ON durations comprising the current ON duration and the next ON duration.

13. An apparatus for wireless communication at a wireless device, comprising:
one or more memories; and
one or more processors coupled to the one or more memories, the one or more processors configured to cause the wireless device to:
apply a power saving mode for sidelink communication, the power saving mode having an ON duration and an OFF duration;
perform at least one of sensing or resource selection for sidelink mode 2 resource allocation based on one or more parameters, the one or more parameters based on the ON duration or the OFF duration of the power saving mode; and
in response to a sidelink resource selection window configured to be triggered at a slot during a current ON duration, and the current ON duration configured to at least partially overlap with the sidelink resource selection window, select a set of resources from one or more of the current ON duration or a next ON duration, wherein the set of resources is from the current ON duration in response to a gap between the slot and a beginning of the next ON duration being larger than a remaining packet delay budget.

14. The apparatus of claim 13, wherein the power saving mode is based on a partial sensing mode of the wireless device or discontinuous reception (DRX) of the wireless device or a second wireless device.

15. The apparatus of claim 13, wherein the sidelink resource selection window associated with the wireless device comprises a first set of one or more resources within the ON duration or a second set of one or more resources within a second ON duration.

16. The apparatus of claim 13, wherein the one or more processors are further configured to cause the wireless device to:
receive a trigger for sidelink resource selection;
determine a time interval between the trigger for the sidelink resource selection and a beginning of the sidelink resource selection window based, at least in part, on the ON duration or the OFF duration of the power saving mode; and
select one or more resources for a sidelink transmission within the sidelink resource selection window.

17. The apparatus of claim 16, wherein the one or more processors are further configured to cause the wireless device to:
receive a time interval indication from an upper layer of the wireless device; and
start the sidelink resource selection window from a start of the ON duration in response to the time interval indication indicating the time interval to be outside of the ON duration for the wireless device.

18. The apparatus of claim 13, wherein the one or more processors are further configured to cause the wireless device to:
monitor for one or more sidelink reservations within a sensing window based on the ON duration or the OFF duration of the power saving mode.

19. The apparatus of claim 18, wherein the sensing window has a duration for a number of slots, and wherein the one or more processors are further configured to cause the wireless device to:
select one or more resources for a sidelink transmission based on slots of the sensing window that are within the ON duration of the power saving mode.

20. The apparatus of claim 19, wherein to select the one or more resources for the sidelink transmission, the one or more processors are further configured to cause the wireless device to exclude one or more resources that are outside of the ON duration of the power saving mode.

21. The apparatus of claim 18, wherein the sensing window comprises a number of slots that overlap with one or more ON durations of the power saving mode.

22. The apparatus of claim 21, wherein the sensing window exclude slots during OFF durations of the power saving mode.

23. The apparatus of claim 18, wherein a first duration associated with the sensing window for the power saving mode is different from a second duration associated with a second power mode based on an upper layer configuration.

24. The apparatus of claim 13, wherein the one or more processors are configured to, individually or in combination, cause the wireless device to apply the power saving mode and perform the at least one of the sensing or the resource selection based on the one or more parameters.

25. The apparatus of claim 13, wherein the sidelink resource selection window spans multiple ON durations comprising the current ON duration and the next ON duration.

26. An apparatus of wireless communication at a wireless device, comprising:
means for applying a power saving mode for sidelink communication, the power saving mode having an ON duration and an OFF duration;
means for performing at least one of sensing or resource selection for sidelink mode 2 resource allocation based on one or more parameters, the one or more parameters being based on the ON duration or the OFF duration of the power saving mode; and means for in response to a sidelink resource selection window configured to be triggered at a slot during a current ON duration, and the current ON duration configured to at least partially overlap with the sidelink resource selection window, selecting a set of resources from one or more of the current ON duration or a next ON duration, wherein the set of resources is from the current ON duration based on a gap between the slot and a beginning of the next ON duration being larger than a remaining packet delay budget.

27. A non-transitory computer-readable storage medium storing computer executable code at a wireless device, the code when executed by one or more processors cause the wireless device to:

apply a power saving mode for sidelink communication, the power saving mode having an ON duration and an OFF duration;

perform at least one of sensing or resource selection for sidelink mode 2 resource allocation based on one or more parameters, the one or more parameters being based on the ON duration or the OFF duration of the power saving mode; and in response to a sidelink resource selection window configured to be triggered at a slot during a current ON duration, and the current ON duration configured to at least partially overlap with the sidelink resource selection window, select a set of resources from one or more of the current ON duration or a next ON duration, wherein the set of resources is from the current ON duration based on a gap between the slot and a beginning of the next ON duration being larger than a remaining packet delay budget.

28. The non-transitory computer-readable storage medium of claim 27, wherein the power saving mode is based on a partial sensing mode of the wireless device or discontinuous reception (DRX) of the wireless device or a second wireless device.

29. The non-transitory computer-readable storage medium of claim 27, wherein the sidelink resource selection window associated with the wireless device comprises a first set of one or more resources within the ON duration or a second set of one or more resources within a second ON duration.

* * * * *